US010261345B2

(12) United States Patent
Du et al.

(10) Patent No.: US 10,261,345 B2
(45) Date of Patent: Apr. 16, 2019

(54) IMAGING ADJUSTMENT DEVICE AND IMAGING ADJUSTMENT METHOD

(71) Applicant: Beijing Zhigu Rui Tuo Tech Co., Ltd, Beijing (CN)

(72) Inventors: Lin Du, Beijing (CN); Hongjiang Zhang, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 332 days.

(21) Appl. No.: 14/779,321

(22) PCT Filed: Dec. 4, 2013

(86) PCT No.: PCT/CN2013/088540
§ 371 (c)(1),
(2) Date: Sep. 23, 2015

(87) PCT Pub. No.: WO2014/206013
PCT Pub. Date: Dec. 31, 2014

(65) Prior Publication Data
US 2016/0161769 A1    Jun. 9, 2016

(30) Foreign Application Priority Data

Jun. 28, 2013  (CN) .......................... 2013 1 0265538

(51) Int. Cl.
*G06K 9/40* (2006.01)
*G02C 11/00* (2006.01)
(Continued)

(52) U.S. Cl.
CPC ............ *G02C 11/10* (2013.01); *G02B 27/017* (2013.01); *G02B 27/0172* (2013.01); *G02C 7/02* (2013.01);
(Continued)

(58) Field of Classification Search
CPC .......... G02C 11/10; G02C 7/02; G02C 7/081; G02C 7/083; G02B 27/017;
(Continued)

(56) References Cited

U.S. PATENT DOCUMENTS 4,264,154 A  4/1981 Petersen
4,572,616 A  2/1986 Kowel et al.
(Continued)

FOREIGN PATENT DOCUMENTS

CN      1372650 A    10/2002
CN      1470227      1/2004
(Continued)

OTHER PUBLICATIONS

International Search Report dated Mar. 6, 2014 for PCT Application No. PCT/CN2013/088540, 8 pages.
(Continued)

*Primary Examiner* — Jonathan S Lee
(74) *Attorney, Agent, or Firm* — Amin, Turocy & Watson, LLP

(57) ABSTRACT

An imaging analysis apparatus includes: an information processing module, used to receive position and depth information of an imaging lens group and/or imaging receiver relative to an object, obtain an imaging parameter corresponding to the imaging lens group according to the position and depth information, and send the obtained imaging parameter. An imaging lens group, used to image an object, can include subregions having adjustable imaging characteristics; and a lens adjustment module, used to receive the imaging parameter of the imaging lens group, determine a subregion corresponding to the imaging parameter, and adjust the imaging characteristic of the subregion. An object can be imaged by using an imaging lens in which each subregion has adjustable imaging parameters, thereby
(Continued)

adjusting and correcting a perspective deformation that occurs on the object, and preventing a perspective deformation from occurring on an image of the object acquired by a user.

34 Claims, 9 Drawing Sheets

(51) Int. Cl.
 *G02B 27/01* (2006.01)
 *G02C 7/08* (2006.01)
 *G02C 7/02* (2006.01)

(52) U.S. Cl.
 CPC .............. *G02C 7/081* (2013.01); *G02C 7/083* (2013.01); *G02B 2027/011* (2013.01); *G02B 2027/014* (2013.01); *G02B 2027/0127* (2013.01)

(58) Field of Classification Search
 CPC .......... G02B 27/0172; G02B 2027/011; G02B 2027/0127; G02B 2027/014
 See application file for complete search history.

(56) References Cited

U.S. PATENT DOCUMENTS

| | | |
|---|---|---|
| 4,973,149 A | 11/1990 | Hutchinson |
| 5,182,585 A | 1/1993 | Stoner |
| 5,537,163 A | 7/1996 | Ueno |
| 6,072,443 A | 6/2000 | Nasserbakht et al. |
| 6,111,597 A | 8/2000 | Tabata |
| 6,151,061 A | 11/2000 | Tokuhashi |
| 6,152,563 A | 11/2000 | Hutchison et al. |
| 6,325,513 B1 | 12/2001 | Bergner et al. |
| 7,001,020 B2 | 2/2006 | Yancey et al. |
| 7,298,414 B2 | 11/2007 | Stavely et al. |
| 7,334,892 B2 | 2/2008 | Goodall et al. |
| 7,486,988 B2 | 2/2009 | Goodall et al. |
| 7,764,433 B2 | 7/2010 | Kam et al. |
| 7,766,479 B2 | 8/2010 | Ebisawa |
| 8,104,892 B2 | 1/2012 | Hillis et al. |
| 8,109,632 B2 | 2/2012 | Hillis et al. |
| 8,282,212 B2 | 10/2012 | Hillis et al. |
| 8,384,999 B1 | 2/2013 | Crosby et al. |
| 8,896,632 B2 | 11/2014 | MacDougall et al. |
| 2002/0101568 A1 | 8/2002 | Eberl et al. |
| 2002/0113943 A1 | 8/2002 | Trajkovic et al. |
| 2003/0043303 A1 | 3/2003 | Karuta et al. |
| 2003/0125638 A1 | 7/2003 | Husar et al. |
| 2005/0003043 A1 | 1/2005 | Sewalt et al. |
| 2005/0014092 A1 | 1/2005 | Hasegawa et al. |
| 2005/0030438 A1 | 2/2005 | Nishioka |
| 2006/0016459 A1 | 1/2006 | Mcfarlane et al. |
| 2006/0103808 A1 | 5/2006 | Horie |
| 2006/0122530 A1 | 6/2006 | Goodall et al. |
| 2006/0146281 A1 | 7/2006 | Goodall et al. |
| 2006/0164593 A1* | 7/2006 | Peyghambarian ........ G02F 1/13 349/200 |
| 2006/0122531 A1 | 8/2006 | Goodall et al. |
| 2007/0019157 A1 | 1/2007 | Hills et al. |
| 2007/0211207 A1 | 9/2007 | Lo et al. |
| 2008/0002262 A1 | 1/2008 | Chirieleison |
| 2008/0106633 A1 | 5/2008 | Blum et al. |
| 2009/0066915 A1 | 3/2009 | Lai |
| 2009/0189974 A1* | 7/2009 | Deering ................... G09G 3/02 348/46 |
| 2009/0279046 A1 | 11/2009 | Dreher et al. |
| 2009/0303212 A1 | 12/2009 | Akutsu et al. |
| 2010/0053539 A1 | 3/2010 | Lin |
| 2011/0018903 A1 | 1/2011 | Lapstun et al. |
| 2011/0019258 A1 | 1/2011 | Levola |
| 2011/0213462 A1 | 1/2011 | Holladay |
| 2011/0051087 A1 | 3/2011 | Inoue et al. |
| 2011/0199202 A1 | 8/2011 | De Mers et al. |
| 2011/0242277 A1 | 10/2011 | Do et al. |
| 2011/0279277 A1 | 11/2011 | Li-Chung |
| 2012/0007959 A1* | 1/2012 | Kwon ................ H04N 13/0022 348/51 |
| 2012/0013389 A1 | 1/2012 | Thomas et al. |
| 2012/0038549 A1* | 2/2012 | Mandella ................ G06F 3/011 345/156 |
| 2012/0092618 A1 | 4/2012 | Yoo et al. |
| 2012/0113235 A1 | 5/2012 | Shintani |
| 2012/0127062 A1* | 5/2012 | Bar-Zeev ................. G02B 3/14 345/6 |
| 2012/0127422 A1 | 5/2012 | Tian et al. |
| 2012/0133891 A1 | 5/2012 | Jiang |
| 2012/0140044 A1 | 6/2012 | Galstian et al. |
| 2012/0154277 A1 | 6/2012 | Bar-Zeev et al. |
| 2012/0169730 A1* | 7/2012 | Inoue ................. G02B 27/0093 345/419 |
| 2012/0206485 A1 | 8/2012 | Osterhout et al. |
| 2012/0212499 A1 | 8/2012 | Haddick et al. |
| 2012/0212508 A1 | 8/2012 | Kimball |
| 2012/0242698 A1 | 9/2012 | Haddick et al. |
| 2012/0290401 A1 | 11/2012 | Neven |
| 2012/0293773 A1* | 11/2012 | Publicover ............. A61B 3/113 351/210 |
| 2012/0307208 A1 | 12/2012 | Trousdale |
| 2013/0044042 A1 | 2/2013 | Olsson et al. |
| 2013/0050432 A1 | 2/2013 | Perez et al. |
| 2013/0050646 A1 | 2/2013 | Nanbara |
| 2013/0072828 A1 | 3/2013 | Sweis et al. |
| 2013/0093997 A1 | 4/2013 | Utsunomiya et al. |
| 2013/0107066 A1 | 5/2013 | Venkatraman et al. |
| 2013/0127980 A1 | 5/2013 | Haddick et al. |
| 2013/0135203 A1 | 5/2013 | Croughwell, III |
| 2013/0147836 A1 | 6/2013 | Small et al. |
| 2013/0194323 A1* | 8/2013 | Choi .................... G02B 26/005 345/697 |
| 2013/0215504 A1* | 8/2013 | Kim ................... G02B 27/2242 359/464 |
| 2013/0241805 A1 | 9/2013 | Gomez |
| 2013/0241927 A1 | 9/2013 | Vardi |
| 2013/0278631 A1 | 10/2013 | Border et al. |
| 2013/0335301 A1 | 12/2013 | Wong et al. |
| 2013/0335404 A1 | 12/2013 | Westerinen et al. |
| 2013/0335833 A1 | 12/2013 | Liao et al. |
| 2013/0342572 A1 | 12/2013 | Poulos et al. |
| 2014/0078175 A1 | 3/2014 | Forutanpour et al. |
| 2014/0160157 A1 | 6/2014 | Poulos et al. |
| 2014/0225915 A1 | 8/2014 | Theimer et al. |
| 2014/0225918 A1 | 8/2014 | Mittal et al. |
| 2014/0232746 A1 | 8/2014 | Ro et al. |
| 2014/0240351 A1 | 8/2014 | Scavezze et al. |
| 2014/0267400 A1 | 9/2014 | Mabbutt et al. |
| 2014/0267420 A1 | 9/2014 | Schowengerdt et al. |
| 2014/0282224 A1 | 9/2014 | Pedley |
| 2014/0327875 A1* | 11/2014 | Blum .................... A61F 2/1618 351/159.03 |
| 2014/0354514 A1 | 12/2014 | Aronsson |
| 2014/0375680 A1 | 12/2014 | Ackerman et al. |
| 2015/0002542 A1 | 1/2015 | Chan et al. |
| 2015/0035861 A1 | 2/2015 | Salter et al. |
| 2015/0234184 A1 | 8/2015 | Schowengerdt et al. |
| 2015/0235632 A1 | 8/2015 | Liu et al. |
| 2015/0070391 A1 | 9/2015 | Nishimaki et al. |
| 2016/0034032 A1* | 2/2016 | Jeong .................... G06F 3/013 345/156 |
| 2016/0035139 A1 | 2/2016 | Fuchs et al. |
| 2016/0062454 A1* | 3/2016 | Wang .................... G09G 5/003 345/633 |
| 2016/0171772 A1 | 6/2016 | Ryznar et al. |
| 2016/0189432 A1 | 6/2016 | Bar-Zeev et al. |
| 2016/0196603 A1 | 7/2016 | Perez et al. |
| 2016/0299360 A1* | 10/2016 | Fonte .................... G02C 7/028 |

(56) References Cited

U.S. PATENT DOCUMENTS

| | | | |
|---|---|---|---|
| 2016/0370605 | A1* | 12/2016 | Ain-Kedem ....... G02B 27/0172 |
| 2017/0092235 | A1* | 3/2017 | Osman ................... G06F 3/012 |

FOREIGN PATENT DOCUMENTS

| | | |
|---|---|---|
| CN | 1141602 | 3/2004 |
| CN | 1527126 | 9/2004 |
| CN | 1604014 | 4/2005 |
| CN | 1645244 | 7/2005 |
| CN | 1653374 | 8/2005 |
| CN | 1901833 | 1/2007 |
| CN | 1912672 | 2/2007 |
| CN | 2868183 | 2/2007 |
| CN | 1951314 | 4/2007 |
| CN | 101069106 A | 11/2007 |
| CN | 101072534 | 11/2007 |
| CN | 101097293 | 1/2008 |
| CN | 101103902 | 1/2008 |
| CN | 201005945 | 1/2008 |
| CN | 101116609 | 2/2008 |
| CN | 101155258 | 4/2008 |
| CN | 101194198 A | 6/2008 |
| CN | 101430429 | 5/2009 |
| CN | 201352278 | 11/2009 |
| CN | 201360319 Y | 12/2009 |
| CN | 101900927 | 1/2010 |
| CN | 101662696 | 3/2010 |
| CN | 201464738 | 5/2010 |
| CN | 101782685 A | 7/2010 |
| CN | 101819331 | 9/2010 |
| CN | 101819334 | 9/2010 |
| CN | 201637953 | 11/2010 |
| CN | 101917638 | 12/2010 |
| CN | 201754203 U | 3/2011 |
| CN | 102008288 | 4/2011 |
| CN | 102083390 | 6/2011 |
| CN | 102203850 | 9/2011 |
| CN | 102292017 | 12/2011 |
| CN | 102419631 | 4/2012 |
| CN | 102481097 | 5/2012 |
| CN | 101149254 | 6/2012 |
| CN | 102487393 | 6/2012 |
| CN | 202267785 | 6/2012 |
| CN | 102572483 A | 7/2012 |
| CN | 102576154 | 7/2012 |
| CN | 202383380 | 8/2012 |
| CN | 102918444 | 2/2013 |
| CN | 102939557 | 2/2013 |
| CN | 102981270 | 3/2013 |
| CN | 103054695 | 4/2013 |
| CN | 103065605 | 4/2013 |
| CN | 103150013 | 6/2013 |
| CN | 103190883 | 7/2013 |
| CN | 103197757 | 7/2013 |
| CN | 103280175 | 9/2013 |
| CN | 103297735 | 9/2013 |
| CN | 103353663 | 10/2013 |
| CN | 103353667 A | 10/2013 |
| CN | 103353677 | 10/2013 |
| CN | 103558909 | 2/2014 |
| DE | 19959379 | 7/2000 |
| EP | 2646859 | 10/2013 |
| JP | 03023431 | 1/1991 |
| JP | 2676870 | 11/1997 |
| JP | H09289973 | 11/1997 |
| JP | 3383228 | 3/2003 |
| JP | 2003307466 | 10/2003 |
| JP | 2005058399 A | 3/2005 |
| JP | 2007129587 | 5/2007 |
| JP | 201143876 | 3/2011 |
| JP | 2012199621 | 10/2012 |
| JP | 2012247449 | 12/2012 |
| TW | 201012448 | 4/2010 |
| WO | 2004023167 | 3/2004 |
| WO | 2005077258 | 8/2005 |
| WO | 2012075218 | 6/2012 |
| WO | 2012083415 | 6/2012 |
| WO | 2013074851 | 5/2013 |

OTHER PUBLICATIONS

Jeong, et al. "Tunable microdoublet lens array", Optics Express, vol. 12, Issue 11, May 2004, pp. 2494-2500.

International Search Report dated Apr. 3, 2014 for PCT Application No. PCT/CN2013/088531, 10 pages.

International Search Report dated Feb. 27, 2014 for PCT Application No. PCT/CN2013/088522, 6 pages.

International Search Report dated May 8, 2014 for PCT Application No. PCT/CN2013/088547, 4 pages.

Kim et al., "A 200 s Processing Time Smart Image Sensor for an Eye Tracker using pixel-level analog image processing", IEEE Journal of Solid-State Circuits, vol. 44, No. 9, Sep. 2009, 10 pages.

Hansen et al., "In the eye of the beholder: a survey of models for eyes and gaze", IEEE Transactions on pattern analysis and machine intelligence, vol. 32, No. 3, Mar. 2010, 23 pages.

International Search Report dated May 28, 2014 for PCT Application No. PCT/CN2013/088553, 6 pages.

International Search Report dated May 28, 2014 for PCT Application No. PCT/CN2013/088545, 4 pages.

International Search report dated Jun. 12, 2014 for PCT Application No. PCT/CN2013/088554, 4 pages.

International Search Report dated Jan. 8, 2015 for PCT Application No. PCT/CN2014/088242, 2 pages.

International Search Report dated May 5, 2014 for PCT Application No. PCT/CN2013/088544, 4 pages.

International Search Report dated Jun. 5, 2014 for PCT Application No. PCT/CN2013/088549, 4 pages.

Smith, et al., "Determining Driver Visual Attention With One Camera", IEEE Transactions on Intelligent Transportation Systems, vol. 4, No. 4, Dec. 2003, 14 Pages.

Singh, et al., "Human Eye Tracking and Related Issues: A Review", International Journal of Scientific and Research Publications, vol. 2, Issue 9, Sep. 2012, ISSN 2250-3153, 9 pages.

Ji et al., "Real-Time Eye, Gaze and Face Pose Tracking for Monitoring Driver Vigilance", Real-Time Imaging 8, 357-377 (2002) available online at http://www.idealibrary.com, 21 pages.

Office Action dated Dec. 29, 2016 for U.S. Appl. No. 14/780,519, 25 pages.

Office Action dated Feb. 27, 2017 for U.S. Appl. No. 14/783,495, 39 pages.

Office Action dated Apr. 21, 2017 for U.S. Appl. No. 14/781,581, 19 pages.

Office Action dated Apr. 20, 2017 for U.S. Appl. No. 14/781,578, 77 pages.

Office Action dated Mar. 30, 2017 for U.S. Appl. No. 15/028,019, 36 pages.

Office Action dated Jun. 29, 2017 for U.S. Appl. No. 14/783,495, 50 pages.

Office Action dated Jun. 29, 2017 for U.S. Appl. No. 14/783,503, 120 pages.

Gao et al. "Measuring Directionality of the Retinal Reflection with a Shack-Hartmann Wavefront Sensor", Dec. 2009, Optics Express, vol. 17, No. 25, Optical Society of America, 20 pages.

Office Action dated Jul. 12, 2017 for U.S. Appl. No. 14/780,519, 45 pages.

Office Action dated Jun. 8, 2017 for U.S. Appl. No. 14/779,968, 79 pages.

Office Action dated May 3, 2017 for U.S. Appl. No. 14/781,306, 46 pages.

Office Action dated Oct. 4, 2017 for U.S. Appl. No. 14/781,584, 95 pages.

Office Action dated Dec. 19, 2017 for U.S. Appl. No. 14/783,503, 78 pages.

Office Action dated Nov. 9, 2017 for U.S. Appl. No. 14/780,519, 24 pages.

Office Action dated Nov. 17, 2017 for U.S. Appl. No. 14/783,495, 32 pages.

(56) References Cited

OTHER PUBLICATIONS

Office Action dated Nov. 9, 2017 for U.S. Appl. No. 14/781,578, 64 pages.
Office Action dated Dec. 15, 2017 for U.S. Appl. No. 14/779,968, 67 pages.
Lee et al. "A Robust Eye Gaze Tracking Method Based on a Virtual Eyeball Model", Machine Vision and Applications, (2009) 20:319-337, Springer-Verlag, 2008. 19 pages.
Office Action dated Jun. 29, 2018 for U.S. Appl. No. 14/781,578, 67 pages.
Notice of Allowance dated Sep. 11, 2018 for U.S. Appl. No. 14/780,519, 29 pages.
Office Action dated Jun. 14, 2018 for U.S. Appl. No. 14/780,519, 29 pages.
Office Action dated Jul. 13, 2018 for U.S. Appl. No. 14/783,495, 36 pages.
Office Action dated Jul. 17, 2018 for U.S. Appl. No. 14/781,584, 75 pages.
Office Action dated Dec. 21, 2018 for U.S. Appl. No. 14/783,495, 35 pages.
Office Action dated Feb. 4, 2019 for U.S. Appl. No. 14/781,578, 69 pages.

* cited by examiner

IMAGING ADJUSTMENT DEVICE AND IMAGING ADJUSTMENT METHOD

RELATED APPLICATIONS

The present application is a U.S. National Stage filing under 35 U.S.C. § 371 of International Patent Cooperation treaty (PCT) application No. PCT/CN2013/088540, filed Dec. 4, 2013, and entitled "IMAGING ADJUSTMENT DEVICE AND IMAGING ADJUSTMENT METHOD," which claims priority to Chinese Patent Application No. 201310265538.0, filed with the Chinese Patent Office on Jun. 28, 2013 and entitled "IMAGING ADJUSTMENT DEVICE AND METHOD", which applications are hereby incorporated herein by reference in their respective entireties.

TECHNICAL FIELD

The subject application relates to the field of imaging technologies, and more particularly to an imaging adjustment device and method.

BACKGROUND

A Galilean telescope can form an upright virtual image 1030a of an observed object 1030 and change an included angle from the virtual image to eyes by using a convex lens 1010 and a concave lens 1020, so as to achieve a visual effect of drawing near or pushing away the observed object along an optical axis 1040. The magnification factor can be changed and focusing can be implemented by adjusting focal lengths of the two lenses and a distance between the lenses, as shown in FIG. 17a to FIG. 17c.

A lens with a fixed focal length has found wide applications in optical devices such as glasses, telescopes, cameras, and microscopes, and by combining lenses of different focal lengths and adjusting a distance between the lenses, a focal length can be dynamically adjusted for a lens group. In addition, for new-type lenses with an electronically adjustable focal length, the focal length of a single lens can also be dynamically adjusted.

Wearable devices such as Google glass and smartwatches are gradually accepted by people, and these electronic smart devices will make people's life more and more convenient.

When a user watches or records an image of an object, a perspective deformation may occur on a received image of the object relative to an original image of the object in a case where the user is not right in front of the object. If the foregoing perspective deformation can be directly adjusted during imaging through imaging lenses, an image with no perspective deformation or a slight degree of perspective deformation of an object can be directly obtained, thereby greatly improving user experience.

SUMMARY

A technical problem to be solved by the subject application is to provide an imaging adjustment device and method, so as to solve or mitigate the problem of a perspective deformation for an object during imaging.

In a first aspect, the subject application provides an imaging analysis apparatus, which includes:

an information processing module, used to receive position and depth information of an imaging lens group and/or imaging receiver relative to an object, obtain an imaging parameter corresponding to the imaging lens group according to the position and depth information, and send the obtained imaging parameter.

In a second aspect, the subject application provides an imaging apparatus, which includes:

an imaging lens group, used to image an object, and including a plurality of subregions with at least one adjustable imaging characteristic; and a lens adjustment module, used to receive an imaging parameter of an imaging lens group output by an imaging analysis apparatus, determine a subregion corresponding to the imaging parameter, and adjust the imaging characteristic of the subregion.

In a third aspect, the subject application provides an imaging adjustment device, which includes the foregoing imaging analysis apparatus and imaging apparatus.

In a fourth aspect, the subject application provides an imaging analysis method, which includes:

receiving position and depth information of an imaging lens group and/or imaging receiver relative to an object;

obtaining an imaging parameter corresponding to the imaging lens group according to the position and depth information; and sending the obtained imaging parameter.

In a fifth aspect, the subject application provides an imaging method, which includes:

receiving at least one imaging parameter of an imaging lens group output from an imaging analysis method, where the imaging lens group is used to image an object, and includes a plurality of subregions with at least one adjustable imaging characteristic; and determining a subregion corresponding to the imaging parameter and adjusting the imaging characteristic of the subregion.

In a sixth aspect, the subject application provides an imaging adjustment method, which includes the foregoing imaging analysis method and imaging method.

In technical solutions of the embodiments of the subject application, an object is imaged by using an imaging lens in which each subregion has adjustable imaging parameters, so as to adjust the imaging parameters for each subregion separately, thereby adjusting and correcting a perspective deformation that occurs on the object, preventing a perspective deformation from occurring on an image of the object acquired by a user, and improving user experience. The subject application is particularly applicable to a case where a plurality of users watches a program on a screen at positions with undesirable angles. In addition, through the method and apparatus of embodiments of the subject application, the imaging parameters of each subregion may be further adjusted to mitigate a refractive error problem of a user's eyes.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The method and apparatus of the subject application are illustrated below in detail with reference to the accompanying drawings and embodiments.

An embodiment of the subject application provides an imaging analysis apparatus 110, which includes:

an information processing module 111, used to receive position and depth information of an imaging lens group and/or imaging receiver relative to an object, obtain an imaging parameter corresponding to the imaging lens group according to the position and depth information, and send the obtained imaging parameter.

In an implementation manner of an embodiment of the subject application, the imaging parameter corresponding to the imaging lens group may be, for example, an imaging parameter of each part in a projection region of an object on the imaging lens group obtained according to geometrical optics and a triangular relationship.

In an implementation manner of an embodiment of the subject application, the position and depth information of the imaging lens group and/or imaging receiver is acquired at the side of the object, the corresponding imaging parameter on the imaging lens group is obtained according to the information, and the obtained imaging parameter is sent to the imaging device, so that the imaging device adjusts the imaging parameter at a corresponding position on the imaging lens group, so as to correct imaging where a perspective deformation occurs because of not being right in front of the object, so that a user obtains imaging of the object after correction, thereby improving user experience.

Figure 1:
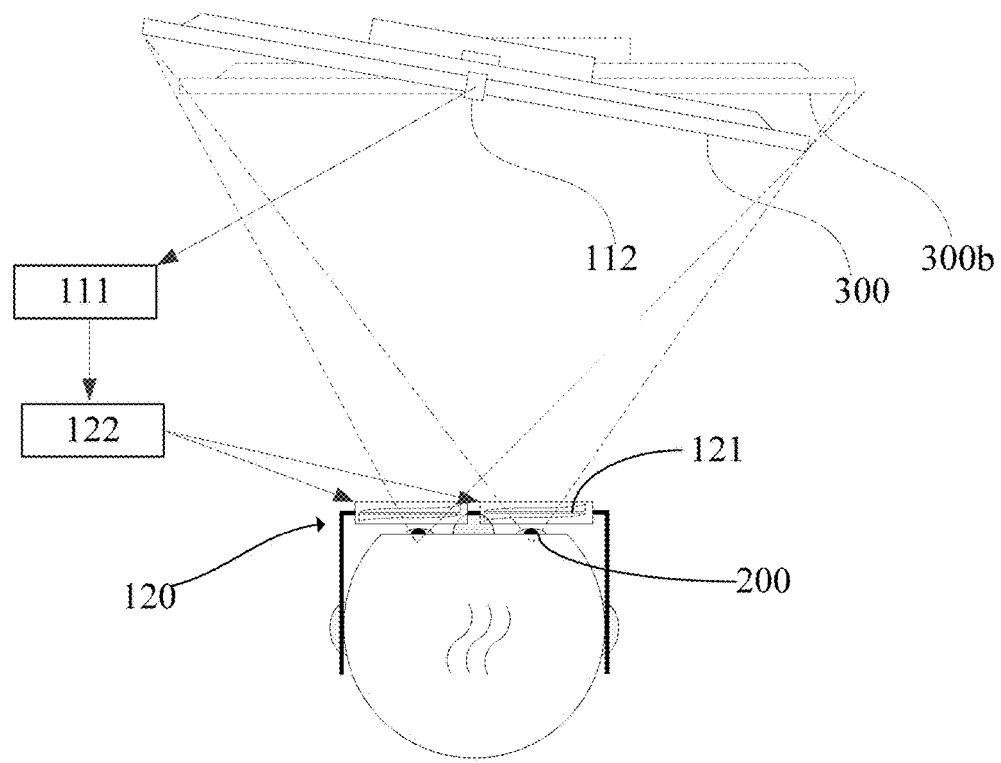
FIG. 1 is a schematic view of an application of an imaging analysis apparatus according to an embodiment of the subject application.

As shown in FIG. 1, in a possible implementation manner of an embodiment of the subject application, the imaging receiver 200 is a user's eyes, and the imaging lens group 121 is glasses (here, except common glasses, the glasses may also be optical devices such as goggles and windshields). Definitely, a person skilled in the art shall know that in other implementation manners of an embodiment of the subject application, the imaging receiver may further be an imaging recording device such as a video recorder and a camera, and the imaging lens group is the glass on the lens of the imaging recording device.

In a possible implementation manner of an embodiment of the subject application, the object 300 is a screen of a display device such as a computer, a television, and a projector. Definitely, in other implementation manners of an embodiment of the subject application, the object may further be other objects.

In a possible implementation manner of an embodiment of the subject application, the information processing module 111 is disposed at the same side as the imaging apparatus 120, for example, a processing module disposed on the glasses. In other possible implementation manners of an embodiment of the subject application, the information processing module 111 may further be disposed at the side of the object 300, for example, disposed at the side of the screen (for example, may be directly inserted in a display device or is disposed near a display device as an external device); or may further be disposed at other positions, for example, disposed in a computer device.

Figure 2:
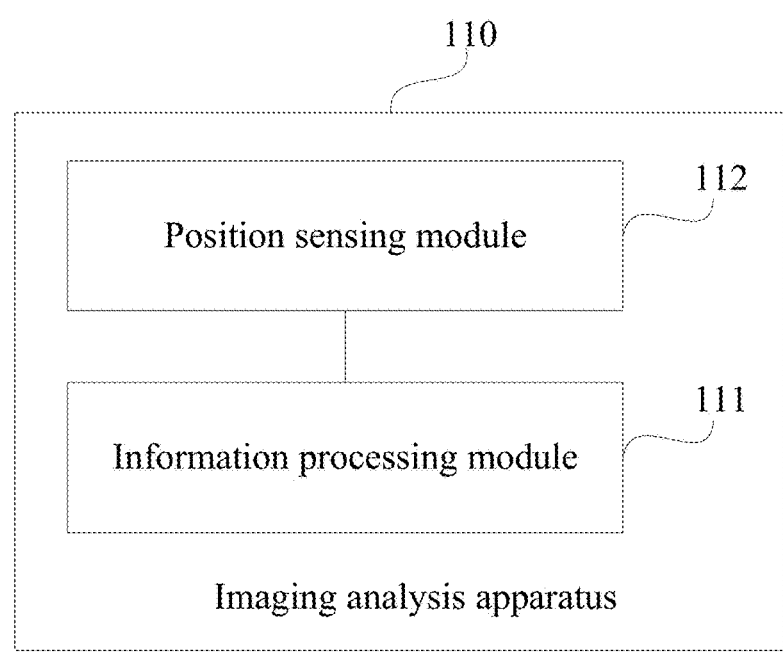
FIG. 2 is a schematic structural block diagram of an imaging analysis apparatus according to an embodiment of the subject application.

In a possible implementation manner of an embodiment of the subject application, as shown in FIG. 1 and FIG. 2, the apparatus further includes a position sensing module 112, used to acquire position and depth information of the imaging lens group 121 and/or imaging receiver 200 relative to the object 300, and send the position and depth information to the information processing module 111.

In this implementation manner, preferably, the position sensing module 112 is a depth sensor, and is used to acquire the position and depth information of the imaging lens group 121 and/or imaging receiver 200 at the side of the object. In this embodiment, the depth sensor may be a depth view of glasses acquired at the side of the screen, a depth view of a human's eyes or a depth view of glasses and a human's eyes, and the depth view includes position and depth information.

Figure 3:
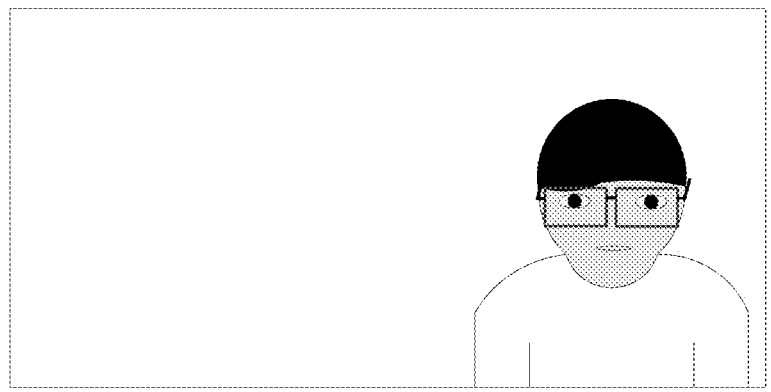
FIG. 3 is a schematic view of a picture of an imaging receiver and an imaging apparatus obtained by an imaging analysis apparatus according to an embodiment of the subject application.

In other possible implementation manners of embodiments of the subject application, the position sensing module may be, for example: an optical sensor (for example, a camera), and is used to acquire image information of the imaging lens group and/or imaging receiver at the side of the object. For example, the image of glasses, the image of a human's eyes, or the image of glasses and a human's eyes are acquired at the side of the screen (as shown in FIG. 3). The position and depth information of each corresponding point on the image can be derived from the deformed image and known image shape information. For example, a normal pupillary distance value between a human's left and right eyes is known, and the position and depth information corresponding to each point on the image can be obtained through obtaining the pupillary distance value on the deformed image.

In other possible implementation manners of an embodiment of the subject application, the position and depth information of the imaging lens group 121 and/or imaging receiver 200 relative to the object received by the information processing module 111 comes from an internal or external position sensing module 112 of the display device, for example, an internal camera on the display device, or may further be, for example, a gaming device peripheral Kinect that has the functions such as real-time dynamic capturing and image recognition, that is, the imaging analysis apparatus may not include the position sensing module 112.

Figure 4:
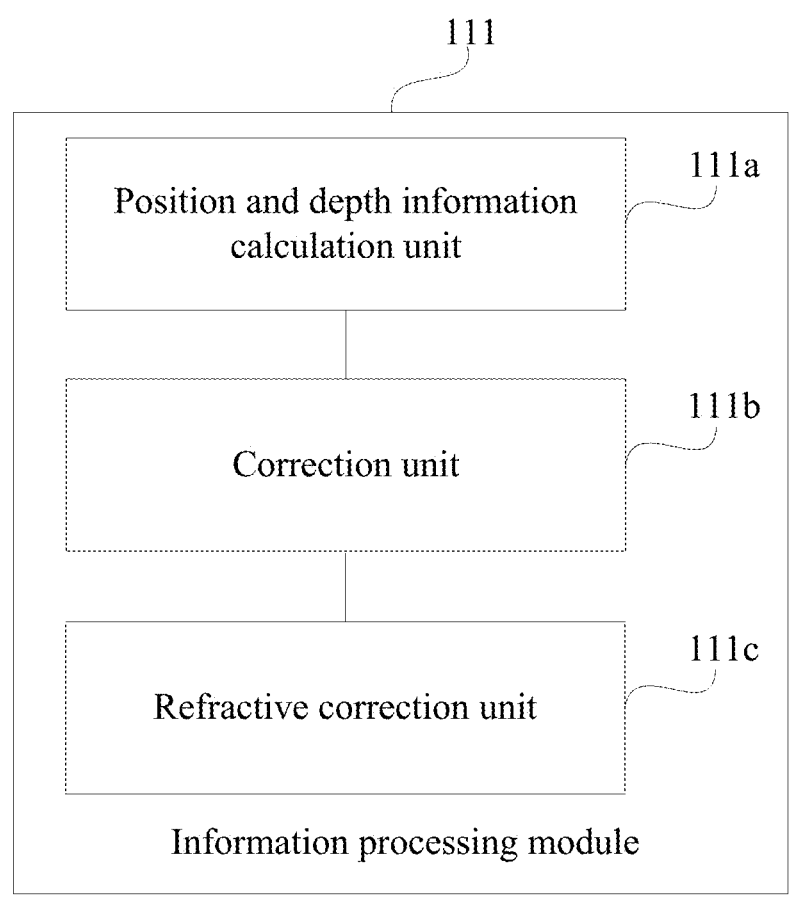
FIG. 4 is a schematic structural block diagram of an information processing module according to an embodiment of the subject application.

As shown in FIG. 4, preferably, in a possible implementation manner of an embodiment of the subject application, the information processing module 111 includes:

a position and depth information calculation unit 111a, used to obtain the position and depth information of the object 300 relative to the imaging lens group 121 according to the position and depth information of the imaging lens group 121 and/or imaging receiver 200 relative to the object 300; and a correction unit 111b, used to determine an imaging parameter of the imaging lens group 121 according to the position and depth information of the object 300 relative to the imaging lens group 121.

Figure 5:
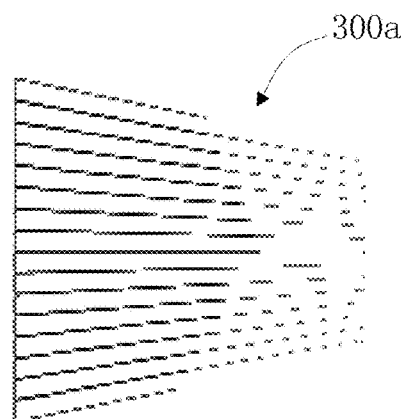
FIG. 5 is a schematic view of a depth view of a screen that should be obtained at the side of glasses obtained by an imaging analysis apparatus according to an embodiment of the subject application.

For example, in this implementation manner, the position and depth information calculation unit calculates a depth view 300a of the screen that should be obtained at the side of the glasses according to the depth view of the glasses and/or human's eyes obtained by the depth sensor (as shown in FIG. 5).

In other implementation manners of an embodiment of the subject application, when the position sensing module 112 is an optical sensor, the position and depth information of the glasses and/or human's eyes relative to the screen can be derived according to the acquired image of the glasses and/or human's eyes, and the position and depth information of the screen relative to the glasses can be calculated.

In this implementation manner, the imaging parameter of the corresponding region on the imaging lens group 121 can be determined through the position and depth information of the object 300 relative to the imaging lens group 121. For example, the position and depth information of a point on the screen relative to the glasses lens is known, the position of the expected virtual image of the screen can be obtained according to the position and depth information, and also the distance between glasses and eyes can be obtained through measurement or estimation, so that the imaging parameter of the region corresponding to the object 300 of the imaging lens group 121 can be calculated according to geometrical optics.

Because the imaging receiver 200 may be a human's eyes, and a human's eyes may have a refractive error problem such as hyperopia, myopia and/or astigmatism, in a possible implementation manner of an embodiment of the subject application, as shown in FIG. 4, the information processing module 111 further includes:

a refractive correction unit 111c, used to, when the imaging receiver 200 has a refractive error, generate an imaging parameter of the imaging lens group 121 corresponding to the refractive error. The refractive correction unit 111c can mitigate or solve the refractive error problem. In this embodiment, for example, the most suitable imaging parameter can be found through the interaction with a user; or the corresponding imaging parameter can further be obtained by obtaining the refractive error information of the imaging receiver 200 known by the user.

In a possible implementation manner of an embodiment of the subject application, the refractive correction unit 111c can receive the refractive error information of the imaging receiver 200 sent from the side of the imaging apparatus 120 to determine whether a refractive error occurs on the imaging receiver 200.

Figure 6:
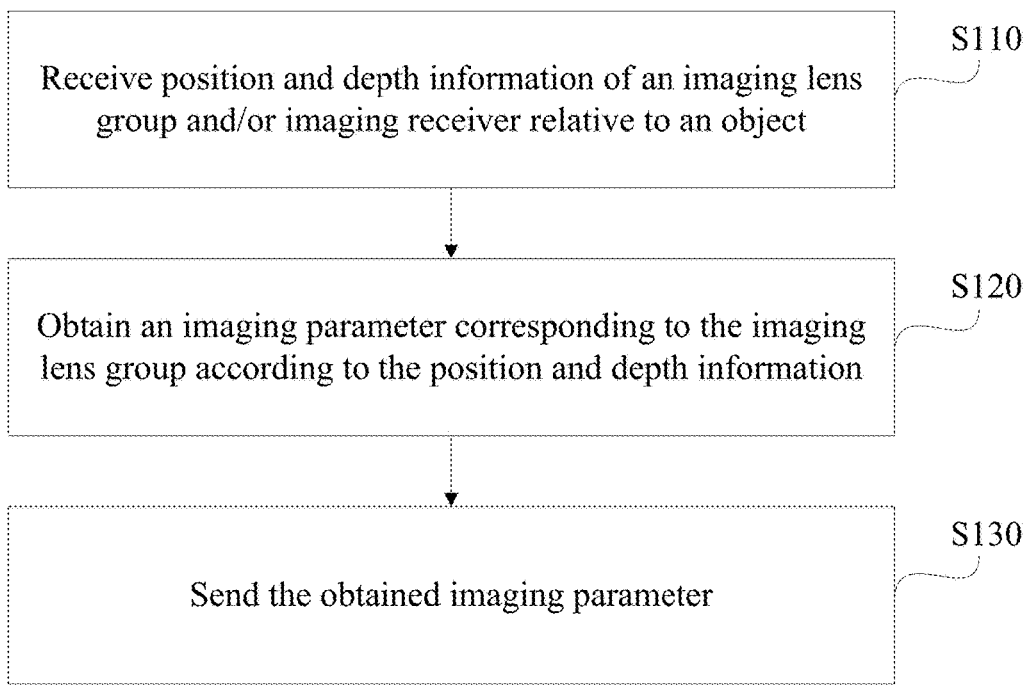
FIG. 6 is a schematic flow chart of an imaging analysis method according to an embodiment of the subject application.

FIG. 6 shows an imaging analysis method according to an embodiment of the subject application, which includes:

S110: Receive position and depth information of an imaging lens group and/or imaging receiver relative to an object.

S120: Obtain an imaging parameter corresponding to the imaging lens group according to the position and depth information.

S130: Send the obtained imaging parameter.

Preferably, in a possible implementation manner of an embodiment of the subject application, the position and depth information of the imaging lens group and/or imaging receiver relative to the object may be: the position and depth information of the imaging lens group and/or imaging receiver acquired at the side of the object.

Preferably, in another possible implementation manner of an embodiment of the subject application, the position and depth information of the imaging lens group and/or imaging receiver relative to the object is: image information of the imaging lens group and/or imaging receiver acquired at the side of the object.

Figure 7:
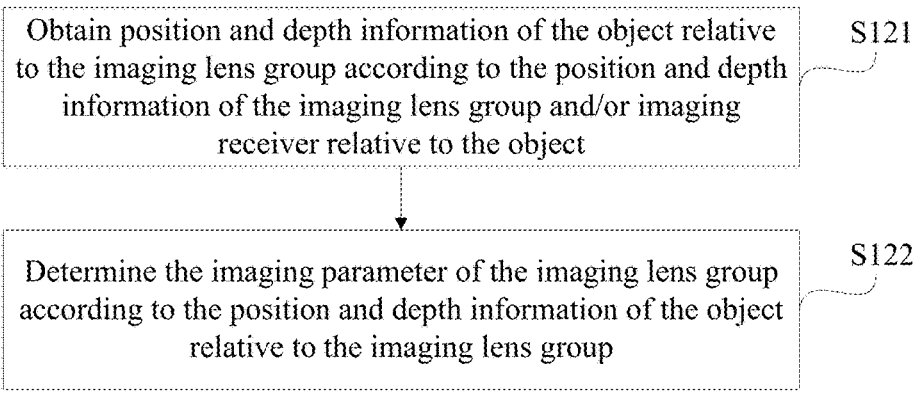
FIG. 7 is a schematic flow chart of steps of an imaging analysis method according to an embodiment of the subject application.

Preferably, in a possible implementation manner of an embodiment of the subject application, as shown in FIG. 7, the obtaining an imaging parameter corresponding to the imaging lens group according to the position and depth information includes:

S121: Obtain position and depth information of the object relative to the imaging lens group according to the position and depth information of the imaging lens group and/or imaging receiver relative to the object.

S122: Determine the imaging parameter of the imaging lens group according to the position and depth information of the object relative to the imaging lens group.

Preferably, in a possible implementation manner of an embodiment of the subject application, the method further includes:

receiving refractive error information of the imaging receiver; and when a refractive error occurs on the imaging receiver, generating the imaging parameter of the imaging lens group corresponding to the refractive error.

The specific implementation manner of the steps of the method in this embodiment can be obtained according to the foregoing embodiment of the imaging analysis apparatus, which is no longer elaborated here.

Figure 8:
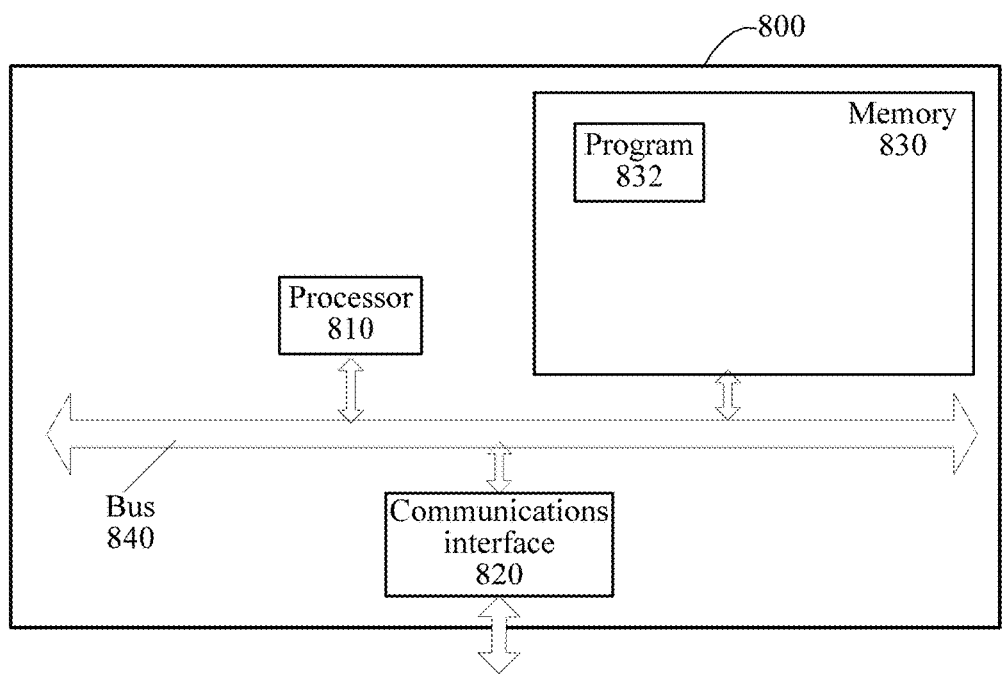
FIG. 8 is a structural block diagram of an information processing module in another imaging analysis apparatus according to an embodiment of the subject application.

FIG. 8 shows a schematic structural view of yet another information processing module 800 provided by an embodiment of the subject application. The specific embodiment of the subject application does not limit the specific implementation of the information processing module 800. As shown in FIG. 8, the information processing module 800 may include:

a processor 810, a communications interface 820, a memory 830, and a communications bus 840.

The communications among the processor 810, the communications interface 820, and the memory 830 are accomplished through the communications bus 840.

The communications interface 820 is used to perform network element communications.

The processor 810 is used to execute a program 832, and specifically can execute relevant steps in the method embodiment shown in FIG. 7.

Specifically, the program 832 may include a program code, and the program code includes a computer operation instruction.

The processor 810 may be a central processing unit (CPU), or an application specific integrated circuit (ASIC), or one or more integrated circuits configured to implement an embodiment of the subject application.

The memory 830 is used to store the program 832. The memory 830 may contain a high-speed random access memory (RAM) memory, or may also further include a non-volatile memory, for example, at least one disk memory. The program 832 can specifically enable the information processing module to execute the following steps:

obtaining the position and depth information of the object relative to the imaging lens group according to the position and depth information of the imaging lens group and/or imaging receiver relative to the object; and determining the imaging parameter of the imaging lens group according to the position and depth information of the object relative to the imaging lens group.

The specific implementation of the steps in the program 832 can be referred to the corresponding description of corresponding steps and units in embodiments, which is no longer elaborated here. A person skilled in the art shall clearly understand that for convenience and simplicity of description, the specific work process of devices and modules described above can be referred to the description of the corresponding process in the foregoing apparatus embodiments, which is no longer elaborated here.

Figure 9A:
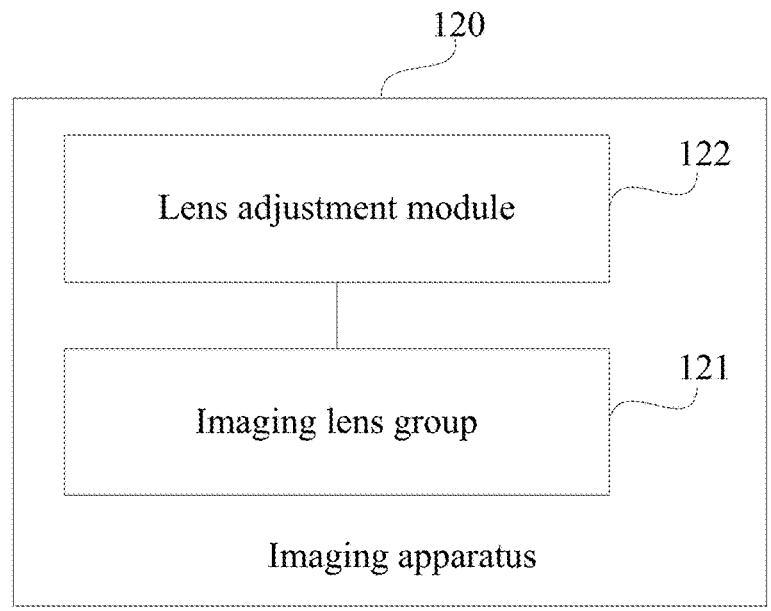
FIG. 9a is a schematic structural block diagram of an imaging apparatus according to an embodiment of the subject application.

FIG. 9*a* shows an imaging apparatus 120 disclosed in a possible implementation manner of an embodiment of the subject application, which includes an imaging lens group 121 and a lens adjustment module 122.

The imaging lens group 121 is used to image an object and includes a plurality of subregions 121*c* having adjustable imaging characteristics. Here, the plurality of subregions 121*c* having adjustable imaging characteristics may be subregions physically independent from each other, or may also be subregions obtained by logically dividing a part that is practically a whole physically.

The lens adjustment module 122 is used to receive an imaging parameter of the imaging lens group 121 output by the imaging analysis apparatus 110, determine a subregion 121*c* corresponding to the imaging parameter, and adjust the imaging characteristic of the subregion 121*c*.

In a possible implementation manner of an embodiment of the subject application, the imaging lens group includes at least two lenses, and a part corresponding to each subregion of the at least one lens of the at least two lenses has an adjustable imaging characteristic, respectively.

In this embodiment, the following illustration mainly uses an example that the imaging adjustment apparatus 121 is glasses.

Figure 10:
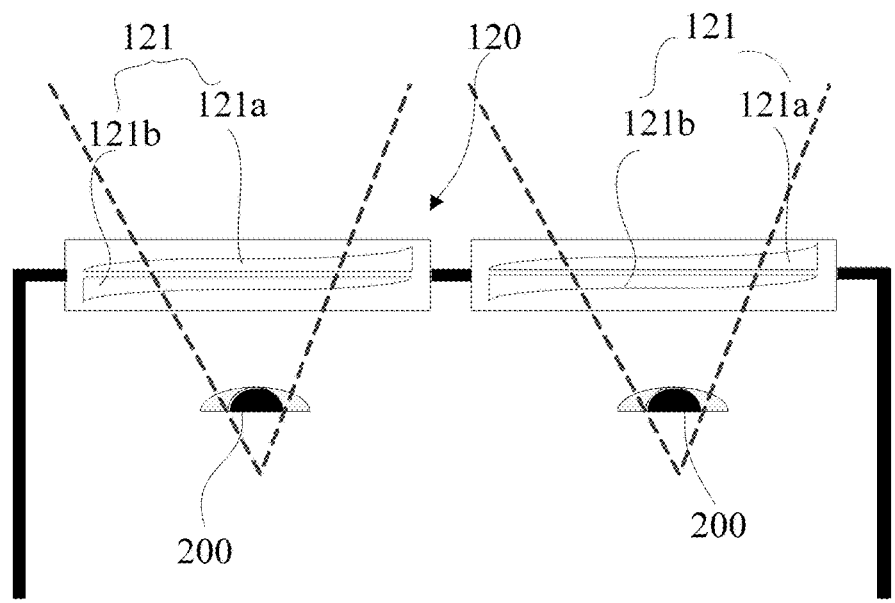
FIG. 10 is a schematic structural view of an imaging apparatus according to an embodiment of the subject application.

As shown in FIG. 10, in this embodiment, the imaging lens group 121 includes a first lens 121*a* near an object and a second lens 121*b* far from the object, and a part corresponding to each subregion 121*c* of the first lens 121*a* and the second lens 122*b* has an adjustable imaging characteristic.

In a possible implementation manner of an embodiment of the subject application, the imaging characteristic includes: a focal length. In this embodiment, the adjustment to the focal length of each subregion 121*c* may be: 1) The focal length of the subregion 121*c* is adjusted through adjusting the curvature of at least one surface of each subregion 121*c*; for example, the curvature of the subregion 121*c* is adjusted by increasing or reducing a liquid medium in a cavity formed by double transparent layers, and in this case, the imaging correction information may be, for example: reducing or increasing the liquid medium of a part corresponding to the subregion 121*c* by a value. 2) The focal length of a subregion 121*c* is adjusted through changing the refractive index of the subregion 121*c*; for example, a specific liquid crystal medium is filled in each subregion, and the arrangement manner of the liquid crystal medium is adjusted through adjusting the voltage of a corresponding electrode of the liquid crystal medium, so as to change the refractive index of the subregion 121*c*; and in this case, the imaging correction information may be, for example: increasing or reducing the voltage of an electrode of a part of a corresponding to the subregion 121*c* by a value.

In a possible implementation manner of an embodiment of the subject application, except the focal length, the imaging characteristic further includes: the relative positions of lenses. Here, the relative positions of lenses can be changed through adjusting a relative distance between lenses along an optical axis direction, and/or relative positions along a vertical optical axis direction, and/or a relative rotational angle about an optical axis. Definitely, it is also possible that only relative positions of parts corresponding to some subregions 121*c* on a lens are changed, and other parts are not changed.

In a possible implementation manner of an embodiment of the subject application, to correct the eyesight for a user that has a problem such as astigmatism and strabismus, the surface of the corresponding subregion 121*c* of the lens can be further adjusted to a cylindrical surface to correct the astigmatism. For a strabismal user, the surface of the corresponding subregion 121*c* of the lens can be adjusted to the prismatic surface to correct strabismus.

Preferably, as shown in FIG. 10, the first lens 121*a* of the imaging lens group is set to be that the curvature of a side facing the object 300 is adjustable, and the second lens 122*b* is set to be that the curvature of a side facing the user's eyes is adjustable, and the positions of the first lens 121*a* and the second lens 121*b* are fixedly set, so that the wearable device has a simple structure and is light and portable.

Preferably, in a possible implementation manner of an embodiment of the subject application, the plurality of subregions 121*c* having adjustable imaging characteristics is distributed in an array. Preferably, the imaging plane of the imaging lens group is divided in a mesh form to obtain the plurality of subregions 121*c*. The plurality of subregions 121*c* may have a same size, or may also be different in size. Generally speaking, when the subregions 121*c* are divided smaller, the precision of adjustment is higher.

Figure 11:
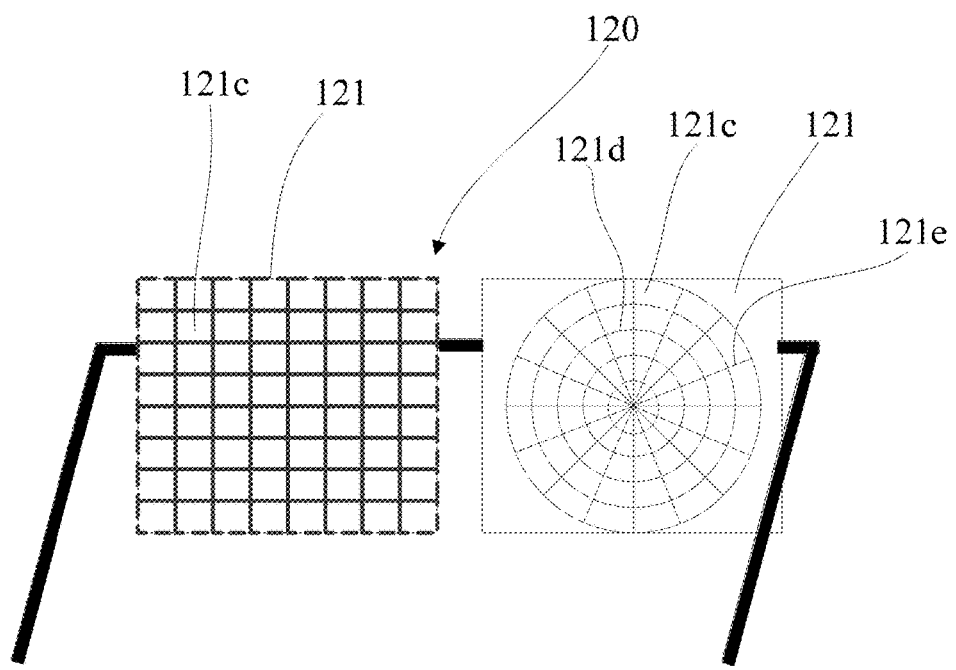
FIG. 11 is a schematic view of distribution of subregions of an imaging lens group in an imaging apparatus according to an embodiment of the subject application.

As shown by the imaging lens group 121 on the left side of the imaging apparatus 120 in FIG. 11, in a possible implementation manner of an embodiment of the subject application, the plurality of subregions 121*c* having adjustable imaging characteristics is distributed in a rectangular array. In this embodiment, the subregions 121*c* have the same size and are arranged in aligned rows and columns. In other embodiments, the subregions 121*c* may also be arranged in staggered rows and columns.

As shown by the imaging lens group 121 on the right side of the imaging apparatus 120 in FIG. 11, the plurality of subregions 121c having adjustable imaging characteristics is distributed in a radially concentric (formed by several concentric circles 121d and several radial lines 121e connecting adjacent concentric circles 121d in a radial direction) array. In this embodiment, the radial lines 121 of the radial concentric circles are arranged in an aligned manner. In other embodiments, radial lines 121e between every two adjacent concentric circles 121d may also be arranged in a nonaligned manner.

In FIG. 11 of this implementation manner, for the need of description, the imaging lens groups 121 of two different kinds of distribution of subregions are placed in one same pair of glasses. In a practical application, a pair of glasses usually has the same or similar distribution of subregions 121c for the left and right imaging lens groups 121.

Definitely, a person skilled in the art shall understand that in addition to the foregoing rectangular array and radially concentric array, the subregions 121c may further be distributed in another type of array or not in an array.

In this embodiment, during the determination of a subregion 121c corresponding to the imaging parameter, the subregion 121c corresponding to the projection can be obtained according to the position of the projection of the object on the imaging lens group 121, and according to different distribution of subregions 121c, one same projection may correspond to different subregions 121c. For example, when one same projection corresponds to the imaging lens groups 121 at the left side and at the right side of the imaging apparatus 120 shown in FIG. 11, respectively, and the obtained corresponding subregions 121c are not same.

In this embodiment, through the adjusted imaging lens group 121, a user can obtain the adjusted image of the object (300b shown in FIG. 1), thereby correcting the perspective deformation of the object.

Figure 9B:
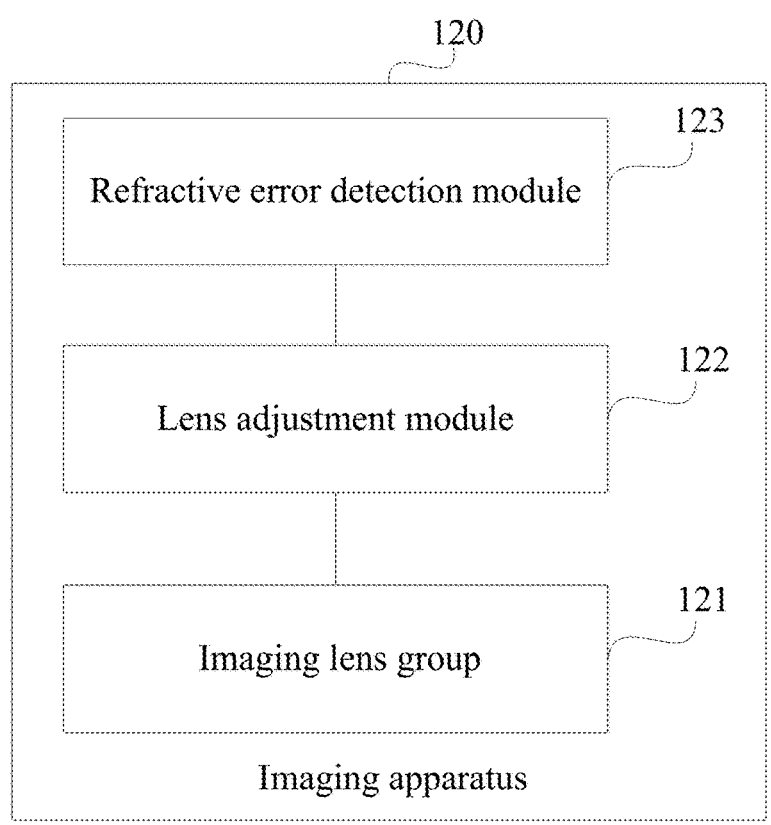
FIG. 9b is a schematic structural block diagram of another imaging apparatus according to an embodiment of the subject application.

As shown in FIG. 9b, in a possible implementation manner of an embodiment of the subject application, the imaging apparatus 120 further includes:

a refractive error detection module 123, used to detect whether a refractive error occurs on the imaging receiver 200, and when a refractive error occurs, generate refractive error information of the imaging receiver 200, and send the refractive error information to the imaging analysis apparatus 110.

In this embodiment, the lens adjustment module 122 adjusts the imaging characteristic of the imaging lens group 121 according to the imaging parameter of the imaging lens group 121 corresponding to the refractive error and returned by the imaging analysis apparatus 110, so as to correct the refractive error of the user's eyes, thereby further improving user experience.

Figure 12:
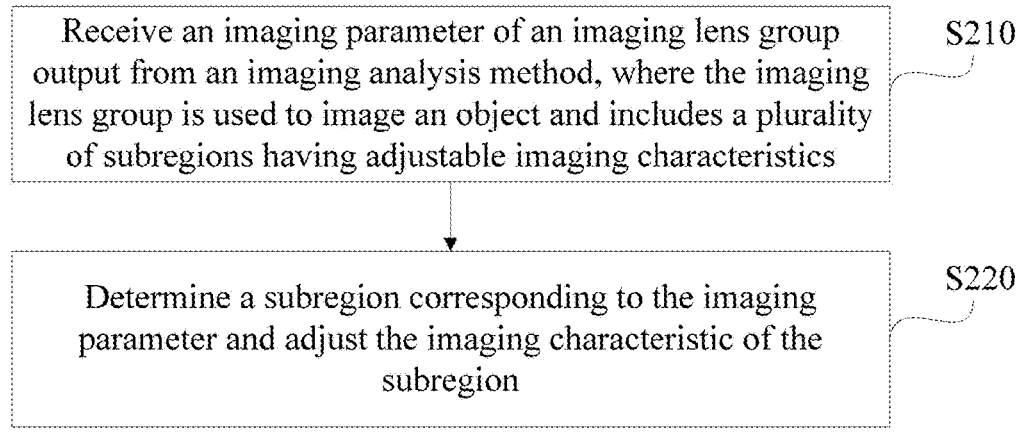
FIG. 12 is a schematic flow chart of an imaging method according to an embodiment of the subject application.

FIG. 12 shows an imaging method disclosed in a possible implementation manner of an embodiment of the subject application, which includes:

S210: Receive an imaging parameter of an imaging lens group output from an imaging analysis method, where the imaging lens group is used to image an object and includes a plurality of subregions having adjustable imaging characteristics.

S220: Determine a subregion corresponding to the imaging parameter and adjust the imaging characteristic of the subregion.

Preferably, in a possible implementation manner of an embodiment of the subject application, the imaging lens group includes at least two lenses, and a part corresponding to each subregion of the at least one lens of the at least two lenses has an adjustable imaging characteristic, respectively.

Preferably, in a possible implementation manner of an embodiment of the subject application, the imaging characteristic includes: a focal length.

Preferably, in a possible implementation manner of an embodiment of the subject application, the imaging characteristic further includes: relative positions of lenses.

Preferably, in a possible implementation manner of an embodiment of the subject application, the plurality of subregions having adjustable imaging characteristics is distributed in an array.

Preferably, in a possible implementation manner of an embodiment of the subject application, the plurality of subregions having adjustable imaging characteristics is distributed in a rectangular array.

Preferably, in another possible implementation manner of an embodiment of the subject application, the plurality of subregions having adjustable imaging characteristics is distributed in a radially concentric array.

Preferably, in a possible implementation manner of an embodiment of the subject application, the method further includes:

a detecting whether a refractive error occurs on the imaging receiver, and when a refractive error occurs, generating refractive error information of the imaging receiver and sending the refractive error information.

The specific implementation manner of the steps in the method in this embodiment can be obtained according to the embodiment of the imaging apparatus, which is no longer elaborated here.

A possible implementation manner of an embodiment of the subject application provides an imaging adjustment device, which includes the imaging analysis apparatus and the imaging apparatus recorded above.

In a possible implementation manner of an embodiment of the subject application, the imaging analysis apparatus and the imaging apparatus are integrated, for example, are both a part of the glass device.

In another possible implementation manner of an embodiment of the subject application, one imaging adjustment device may include one imaging analysis apparatus and a plurality of imaging apparatuses. That is, for example, when a plurality of imaging receivers watches an object at the same time (for example, a plurality of persons watches a screen at the same time), one imaging analysis apparatus acquires depth views or images of a plurality of imaging receivers and/or imaging apparatuses, so as to obtain position and depth information of each imaging receiver and/or imaging apparatus relative to the object. Next, the information processing module processes the position and depth information, respectively, so as to obtain the imaging parameter of the imaging lens group corresponding to each piece of position and depth information, and send the imaging parameter to the corresponding imaging apparatus (the imaging parameter may be sent in a one-to-one corresponding manner, or the imaging parameters of all imaging lens groups are sent together and then the corresponding imaging parameter is recognized at the side of the imaging apparatus). The imaging apparatus then adjusts the imaging lens group according to the corresponding imaging parameter, so as to enable a plurality of imaging receivers to obtain an image of an object without a deformation or with a slight deformation at a different watching angle.

The specific structures of the imaging analysis apparatus and the imaging apparatus are referred to the description of the foregoing apparatus embodiment, respectively, which is no longer described here.

A possible implementation manner of an embodiment of the subject application provides an imaging adjustment method, which includes the foregoing imaging analysis method and imaging method, and is specifically:

receiving position and depth information of an imaging lens group and/or imaging receiver relative to an object;

obtaining an imaging parameter corresponding to the imaging lens group according to the position and depth information; and determining a subregion corresponding to the imaging parameter and adjusting the imaging characteristic of the subregion.

The specific implementation manner of the steps can be referred to the description in the foregoing method embodiment, respectively, which is no longer described here.

A person skilled in the art may understand that in the method of the specific implementation manner of the subject application, the sequence numbers of the steps do not mean a specific execution sequence, and the execution sequence of the steps should be determined based on the functions and internal logic thereof, rather to constitute any limitation on the implementation process of the specific implementation manner of the subject application.

Figure 13:
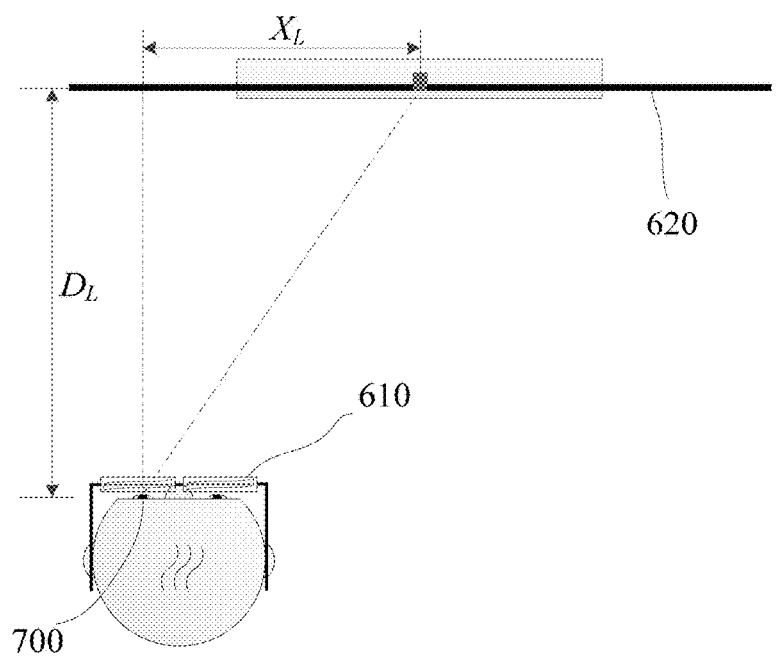
FIG. 13 is a schematic view of an imaging adjustment method according to an embodiment of the subject application.
Figure 14:
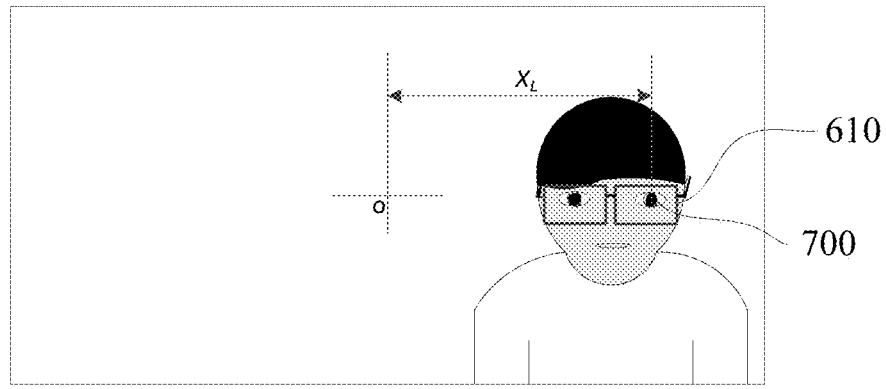
FIG. 14 is a schematic view of an imaging apparatus and an imaging receiver acquired at the side of the object according to an embodiment of the subject application.

As shown in FIG. 13, the implementation manners of the apparatus and method embodiments of the subject application are further illustrated below by using an example in which a user watches a screen 620 through an intelligent glass device 610 (that is, the imaging receiver is a viewer's eyes, the imaging adjustment device is an intelligent glass device 610, and the object is a screen 620 of the display image) as an example:

When the watching position of a viewer is not right in front, the offset position and distance of the viewer can be obtained with the depth or image sensor and through parameters such as a known screen size, the position of the depth or image sensor, the focal length, and pixels (belonging to the prior art, which is no longer elaborated in this embodiment). FIG. 14 shows a schematic view of a viewer wearing the intelligent glass device 610 captured in real time by the depth or image sensor located on the screen 620. In FIG. 13 and FIG. 14, $X_L$ is the distance from the viewer's left eye 700 to the center o of the screen, and the distance $D_L$ from the left eye 700 to the screen can be obtained through the conversion of the depth view, or can be obtained through conversion of a known pupillary distance or the calculation of triangle geometry by adopting an image sensor such as a monocular or binocular camera.

Figure 15:
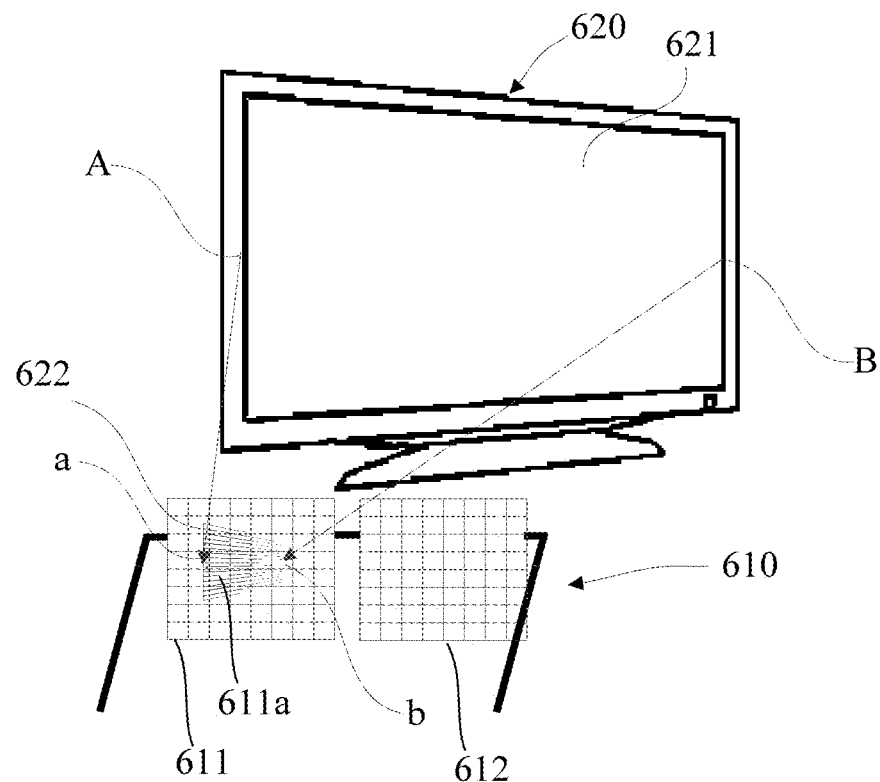
FIG. 15 is a schematic view of the projection of a screen on an imaging lens group obtained according to an embodiment of the subject application.

A corresponding deformation of the screen and a projection 622 of a display region 621 of a deformed screen 620 on the lens of the intelligent glass device 610 corresponding to the viewer's left eye 700 can be obtained through calculation of triangle geometry according to the position of the viewer (the distance $X_L$ from the viewer's left eye to the center o of the screen and the distance $D_L$ from the left eye to the screen 620), as shown in FIG. 15.

In FIG. 15, a point a and a point b on the intelligent glass device 610 are intersections between connecting lines of a point A and a point B on the screen 620 and the eyes and the imaging lens group 611 on the left side of the intelligent glass device 610 (that is, the left lens), respectively. Next, a required correction parameter is calculated for subregions 611a covered by the projection 622, respectively. In the end, the calculation result is spread to the entire lens through a classic extrapolation algorithm to achieve a smooth transition effect. A similar method can be used for the imaging lens group 612 on the right side of the intelligent glass device 610 (that is, the right lens) to obtain a corresponding correction parameter. If the degree of correction is large, a parameter such as an optical axis 650 of a lens of each subregion of the two lenses further needs to be adjusted to keep the parallax of the left eye and right eye unchanged before and after correction.

Figure 16:
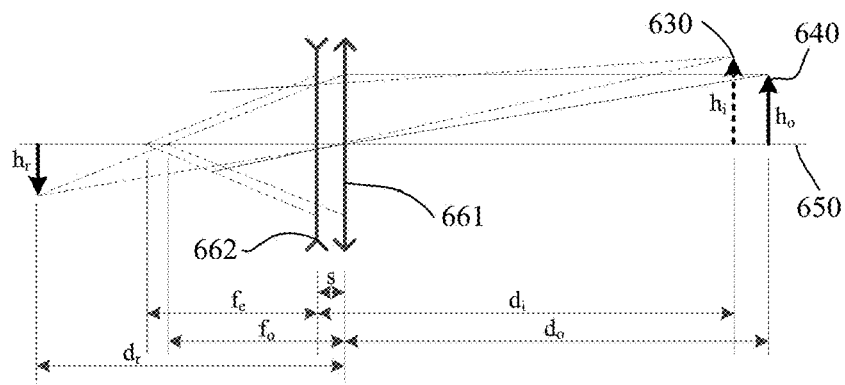
FIG. 16 is a schematic view of obtaining an imaging parameter according to the positions of an object, an imaging lens group, and an imaging receiver according to an embodiment of the subject application.
Figure 17A:
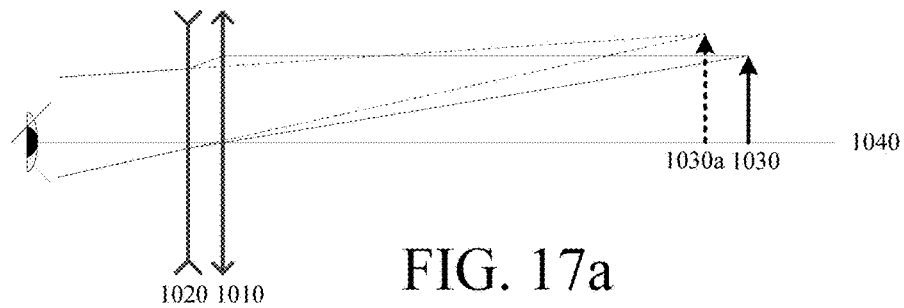
FIG. 17a-FIG. 17c are schematic views of imaging an object using a lens group in the prior art.
Figure 17B:
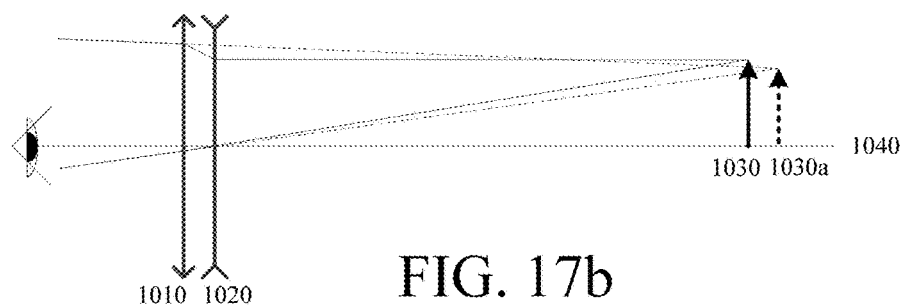
Figure 17C:
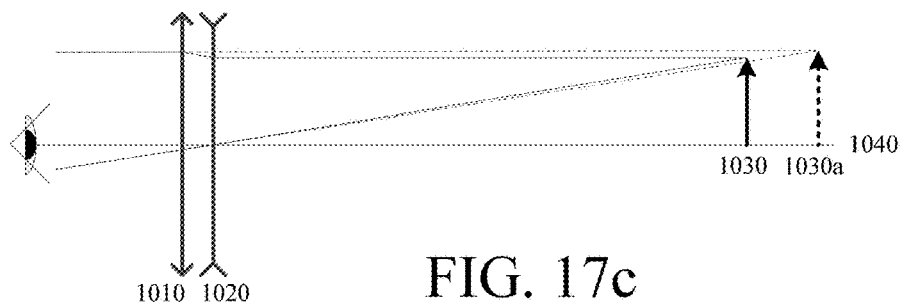

As shown in FIG. 16, because the depth from each point on the screen 620 to the intelligent glass device 610 can be obtained through the above calculation and analysis, the correction target function for a random subregion of the imaging lens group covered by the projection can be obtained:

$$\begin{cases} h_i = h_o \\ d_i = \dfrac{d_{o,max} + d_{o,min}}{2} + s \end{cases} \quad (1)$$

where $h_i$ and $h_o$ are the sizes of a virtual image 630 and a practical object 640 (the screen in this implementation manner), respectively, $d_i$ is the distance of the virtual image, $d_{o,max}$ and $d_{o,min}$ are the longest and shortest distances in the depth view of the practical object, for example, the depth of the point A and the point B in FIG. 15, s is the distance between the first lens 661 near the practical object 640 and the second lens 662 near the viewer's eyes in the subregion.

Formula (2) can be obtained by combining the lens imaging formula in the classic optical theory:

$$\begin{cases} \dfrac{1}{d_o} + \dfrac{1}{d_r} = \dfrac{1}{f_o} \\ \dfrac{1}{d_r - s} + \dfrac{1}{d_i} = \dfrac{1}{f_e} \\ \dfrac{h_o}{h_i} = \dfrac{d_o}{d_r} \cdot \dfrac{d_r - s}{d_i} \end{cases} \quad (2)$$

where $d_r$ is the distance from the real image 670 to the first lens 661 (in FIG. 16, $h_r$ is the size of the real image 670), $d_o$ is the distance between the practical object 640 and the first lens 661, and $f_e$ and $f_o$ are the values of focal lengths of the second lens 662 and the first lens 661, respectively.

Because the distance s between the second lens 662 and the first lens 661 of the subregion may be obtained according to the mechanical structure of glasses, the correction information generation unit can eventually perform calculation according to formulas (1) and (2) to obtain the imaging parameter of the imaging lens group after the correction for the subregion, that is, the values of the focal lengths of the second lens 662 and the first lens 661 are $f_e$ and $f_o$:

$$\begin{cases} f_o = \dfrac{s \cdot d_o}{\Delta d} \\ f_e = \dfrac{s \cdot d_i}{\Delta d} \end{cases} \quad (3)$$

where $\Delta d = d_o - (d_i - s)$ is the distance between the practical object 640 and the corresponding virtual image 630, and $d_i$ can be obtained through calculation based on formula (1) and is a constant for the entire screen.

Therefore, by applying formula (3) on each subregion, the values of the focal lengths of the second lens 662 and the first lens 661 can be calculated. The lens adjustment module then adjusts the focal lengths of corresponding subregions of the first lens 661 and the second lens 662, so as to correct the deformation problem of the screen.

FIG. 16 only shows the correction of a deformation in the height direction for the object. The deformation of the object in the width direction can also be corrected through the foregoing formula.

In conclusion, a method and apparatus of the subject application can correct an image deformation problem because of being not right in front of an object, thereby improving user experience.

Persons of ordinary skill in the art may further appreciate that, in combination with the examples described in embodiments herein, units and algorithm steps may be implemented by electronic hardware or a combination of computer software and electronic hardware. Whether these functions are performed using hardware or software depends on particular applications and design constraints of technical solutions. A person skilled in the art may use different methods to implement the described functions for each specific application. However, such implementation should not be considered as beyond the scope of the subject application.

If implemented in the form of software functional units and sold or used as an independent product, the functions may also be stored in a computer readable storage medium. Based on this, a technical solution or the part that makes contributions to the prior art can be substantially embodied in the form of a software product. The computer software product may be stored in a storage medium and contain several instructions to instruct computer equipment (for example, a personal computer, a server, or network equipment) to perform all or a part of the steps of the method described in embodiments of the subject application. The storage medium may be any medium that is capable of storing program codes, such as a universal serial bus (USB) flash drive, a removable hard disk, a read-only memory (ROM), a RAM, a magnetic disk or an optical disk.

The above implementation manners are merely provided for describing the subject application, but not intended to limit the subject application. It should be understood by persons of ordinary skill in the art that various changes and variations can be made without departing from the spirit and scope of the subject application as defined by the claims of the subject application.

What is claimed is:

1. An apparatus, comprising:
a memory, coupled to a processor, used to store executable modules, comprising:
an information processing module used to receive position information and depth information of an imaging lens group or an imaging receiver relative to an object, and obtain at least one imaging parameter corresponding to the imaging lens group according to the position information and the depth information, wherein the imaging lens group is used to image the object and comprises a plurality of subregions with at least one adjustable imaging characteristic, and wherein a subregion of the plurality of subregions is a first subregion of the imaging lens group physically independent from a second subregion of the imaging lens group, or is a third subregion determined by logically dividing the imaging lens group; and
a transmission module used to initiate sending the at least one imaging parameter, wherein each imaging parameter of the at least one imaging parameter corresponds to a part in a projection region of the object on the imaging lens group to correct a perspective deformation of the object.

2. The apparatus of claim 1, wherein the executable modules further comprise:
a position sensing module used to acquire the position information and the depth information of the imaging lens group or the imaging receiver relative to the object, and send the position information and the depth information to the information processing module.

3. The apparatus of claim 2, wherein the position sensing module comprises:
a depth sensor used to acquire the position information and the depth information of the imaging lens group or the imaging receiver at the side of the object.

4. The apparatus of claim 2, wherein the position sensing module comprises:
an optical sensor used to acquire image information of the imaging lens group or the imaging receiver at the side of the object.

5. The apparatus of claim 1, wherein the information processing module comprises:
a position and depth information calculation unit used to obtain other position information and other depth information of the object relative to the imaging lens group according to the position information and the depth information of the imaging lens group or the imaging receiver relative to the object.

6. The apparatus of claim 5, wherein the information processing module comprises:
a correction unit used to determine the at least one imaging parameter of the imaging lens group.

7. The apparatus of claim 1, wherein the information processing module further comprises:
a refractive correction unit used to, in response to a refractive error being determined to have occurred on an imaging receiver, generate the at least one imaging parameter of the imaging lens group corresponding to the refractive error.

8. The apparatus of claim 7, wherein the refractive correction unit is further used to receive refractive error information of the imaging receiver.

9. An apparatus, comprising:
an imaging lens group used to image an object, and comprising a plurality of subregions with at least one adjustable imaging characteristic, wherein the plurality of subregions comprise first subregions of the imaging lens group that are physically independent from each other, or comprise second subregions obtained by logically dividing the imaging lens group; and
a lens adjustment module comprising a processor, wherein, in response to receiving at least one imaging parameter of the imaging lens group from an imaging analysis apparatus, the processor of the lens adjustment module determines a subregion corresponding to an imaging parameter of the at least one imaging parameter, and adjust an imaging characteristic of the at least one adjustable imaging characteristic of the subregion, wherein each of the at least one imaging parameter corresponds to a part in a projection region of the object on the imaging lens group to correct a perspective deformation of the object.

10. The apparatus of claim 9, wherein the part in the projection region is a first part, and wherein the imaging lens group comprises at least two lenses, and a second part, corresponding to each subregion of the at least one lens of the at least two lenses, has an adjustable imaging characteristic of the at least one adjustable imaging characteristic, respectively.

11. The apparatus of claim 9, wherein the imaging characteristic comprises: a focal length.

12. The apparatus of claim 11, wherein the imaging characteristic further comprises: relative positions of lenses of the imaging lens group.

13. The apparatus of claim 9, wherein the plurality of subregions having the at least one adjustable imaging characteristic is distributed in an array.

14. The apparatus of claim 13, wherein the plurality of subregions having the at least one adjustable imaging characteristic is distributed in a rectangular array.

15. The apparatus of claim 13, wherein the plurality of subregions having the at least one adjustable imaging characteristic is distributed in a radially concentric array.

16. The apparatus of claim 9, wherein the imaging apparatus further comprises:
a refractive error detection sensor that detects an occurrence of a refractive error on an imaging receiver, and in response to the occurrence of the refractive error, generates corresponding refractive error information related to the imaging receiver.

17. The apparatus of claim 16, wherein the refractive error detection sensor sends the corresponding refractive error information related to the imaging receiver to the imaging analysis apparatus.

18. The apparatus of claim 9, wherein the imaging apparatus is glasses.

19. An imaging adjustment device, comprising:
an imaging lens group used to image an object, and comprising a plurality of subregions with at least one adjustable imaging characteristic, wherein a subregion of the plurality of subregions of the imaging lens group is physically independent from another subregion of the plurality of subregions, or the subregion is obtained by logically dividing the imaging lens group;
a processor; and
a memory that stores executable instructions that, when executed by the processor, facilitate performance of operations, comprising:
in response to receiving at least one imaging parameter of the imaging lens group from an imaging analysis apparatus, determining a subregion corresponding to an imaging parameter of the at least one imaging parameter, and adjusting an imaging characteristic of the at least one adjustable imaging characteristic of the subregion; and
receiving position information and depth information of the imaging lens group or an imaging receiver relative to the object, obtaining at least one imaging parameter corresponding to the imaging lens group according to the position information and the depth information, and initiating sending the at least one imaging parameter, wherein each imaging parameter of the at least one imaging parameter corresponds to a part in a projection region of the object on the imaging lens group to correct a perspective deformation of the object.

20. A method, comprising:
receiving, by a device comprising a processor, position and depth information of an imaging lens group or an imaging receiver relative to an object;
obtaining at least one imaging parameter corresponding to the imaging lens group according to the position and depth information, wherein the imaging lens group comprises a plurality of subregions with at least one adjustable imaging characteristic, and wherein a subregion of the plurality of subregions is a first subregion of the imaging lens group physically independent from a second subregion of the imaging lens group, or is a third subregion determined by logically dividing the imaging lens group; and
sending the at least one imaging parameter,
wherein, to correct perspective deformation of the object, each imaging parameter of the at least one imaging parameter corresponds to a part in a projection region of the object on the imaging lens group.

21. The method of claim 20, wherein the position and depth information of the imaging lens group or the imaging receiver relative to the object is: the position and depth information of the imaging lens group or the imaging receiver acquired at a side of the object.

22. The method of claim 20, wherein the position and depth information of the imaging lens group or the imaging receiver relative to the object is: image information of the imaging lens group or the imaging receiver acquired at a side of the object.

23. The method of claim 20, wherein the obtaining the at least one imaging parameter corresponding to the imaging lens group according to the position and depth information comprises:
obtaining other position and depth information of the object relative to the imaging lens group according to the position and depth information of the imaging lens group or the imaging receiver relative to the object; and
determining the at least one imaging parameter of the imaging lens group according to the other position and depth information of the object relative to the imaging lens group.

24. The method of claim 20, wherein the method further comprises:
in response to a refractive error being determined to have occurred on an imaging receiver, generating the at least one imaging parameter of the imaging lens group corresponding to the refractive error.

25. The method of claim 24, wherein, prior to the refractive error being determined to have occurred, generating the at least one imaging parameter of the imaging lens group corresponding to the refractive error, and the method further comprises:
receiving refractive error information of the imaging receiver.

26. A method, comprising:
receiving, by a system comprising a processor, at least one imaging parameter of an imaging lens group output from an imaging analysis process, wherein the imaging lens group is used to image an object, and comprises a plurality of subregions with at least one adjustable imaging characteristic, and wherein a subregion of the plurality of subregions is a first subregion of the imaging lens group physically independent from a second subregion of the imaging lens group, or is a third subregion determined by logically dividing the imaging lens group; and
determining a subregion corresponding to an imaging parameter of the at least one imaging parameter and adjusting an imaging characteristic, of the at least one adjustable imaging characteristic, of the subregion,
wherein each imaging parameter of the at least one imaging parameter corresponds to a part in a projection region of the object on the imaging lens group for correction of a perspective deformation of the object.

27. The method of claim 26, wherein the imaging lens group comprises at least two lenses, and another part, corresponding to each subregion of the at least one lens of the at least two lenses, has an adjustable imaging characteristic of the at least one adjustable imaging characteristic.

28. The method of claim 27, wherein the imaging characteristic comprises: a focal length.

29. The method of claim 28, wherein the imaging characteristic further comprises: relative positions of lenses of the at least one adjustable imaging characteristic.

30. The method of claim 26, wherein the plurality of subregions having the at least one adjustable imaging characteristic is distributed in an array.

31. The method of claim 30, wherein the plurality of subregions having the at least one adjustable imaging characteristic is distributed in a rectangular array.

32. The method of claim 30, wherein the plurality of subregions having the at least one adjustable imaging characteristic is distributed in a radially concentric array.

33. The method of claim 26, further comprising:
detecting whether a refractive error has occurred on an imaging receiver, and when the refractive error occurs, generating refractive error information of the imaging receiver and sending the refractive error information.

34. A computer readable storage device comprising executable instructions that, in response to execution, cause a device comprising a processor to perform operations, comprising:
receiving position and depth information of an imaging lens group or an imaging receiver relative to an object;
obtaining at least one imaging parameter corresponding to the imaging lens group according to the position and depth information; and
sending the at least one imaging parameter,
wherein each of the at least one imaging parameter corresponds to a part in a projection region of the object on the imaging lens group to correct perspective deformation of the object, the imaging lens group is used to image the object and comprises a plurality of subregions with at least one adjustable imaging characteristic, and wherein the subregions of the plurality of subregions of the imaging lens group are physically independent from each other, or the subregions are obtained by logically dividing the imaging lens group.

* * * * *